United States Patent [19]
MacDonald

[11] Patent Number: 6,044,185
[45] Date of Patent: Mar. 28, 2000

[54] OPTICAL SWITCH MODULE

[76] Inventor: Robert I. MacDonald, 6452 Clingin Lane, Manotick, Ontario, Canada

[21] Appl. No.: 09/006,891

[22] Filed: Jan. 14, 1998

Related U.S. Application Data

[63] Continuation-in-part of application No. 08/915,675, Aug. 21, 1997, Pat. No. 5,903,686.
[51] Int. Cl.[7] .......................................................... G02B 6/26
[52] U.S. Cl. .................................. 385/16; 385/17; 385/24; 359/117; 359/128
[58] Field of Search ................................... 385/16, 17, 18, 385/19, 20, 21, 22, 23, 24; 359/117, 128, 139, 154, 173

[56] References Cited

U.S. PATENT DOCUMENTS

| | | | |
|---|---|---|---|
| 4,378,144 | 3/1983 | Duck et al. ................................. | 385/16 |
| 4,580,873 | 4/1986 | Levinson .................................... | 385/17 |
| 4,988,157 | 1/1991 | Jackel et al. ............................... | 385/17 |
| 5,903,686 | 11/1999 | MacDonald ............................... | 385/16 |

*Primary Examiner*—Phan T. H. Palmer
*Attorney, Agent, or Firm*—Neil Teitelbaum & Associates

[57] ABSTRACT

A system of interconnected functionally identical modules for switching P optical signals to P locations in a non-blocking manner is disclosed. Each of the functionally identical modules provides a same function, which may or may not be provided in an identical manner. Each module has several of first ports and several second ports optically coupled to second ports of other modules. Switching means are provided for switching means for switching between the first ports and the second ports. Each module has at least a second port is directly coupled to another second port. Providing a system wherein modules are identical provides numerous advantages. The architecture further provides the advantage of ease of repair within no disturbance to communications being handled by other modules.

12 Claims, 7 Drawing Sheets

OPTICAL SWITCH MODULE

This application is a continuation-in-part of U.S. patent application Ser. No. 08/915,675 filed Aug. 21, 1997 U.S. Pat. No. 5,903,686.

FIELD OF THE INVENTION

This invention relates to optical switching devices and more particularly, to a module for use in a non-blocking optical system.

BACKGROUND OF THE INVENTION

Various forms of optical switches are known; however, at present, large 1×n cross-point optical switches are often configured to obtain functionality provided by n×m matrix switches. In some instances, reliability and cost are reasons for using this "dated" technology in an n×m configuration.

U.S. Pat. No. 4,580,873 in the name of Levinson issued Apr. 8, 1986 to AT&T Bell Laboratories describes a different type of n×m optical switch formed on a semiconductor; U.S. Pat. No. 4,988,157 in the name of Jackel et al. describes an n×m optical switch similar to that of the '873 patent, however wherein the presence and absence of air bubbles are used in place of movable mirrors to provide selectable reflective/transmissive cross points. Although in principle both of these devices appear to perform their intended function, neither of these switches has been commercialized on a large scale. Furthermore, the reliability of these devices in not yet known.

Thus, today, currently available switching matrices are being manufactured by use of a single stage architecture where both input and output sides of a P×P matrix are comprised of 1×P rotary switches. A rotary switch of this type is described by Duck et al. in U.S. Pat. No. 4,378,144. Duck et al. propose an arrangement wherein a faceplate comprising a number of collimating lenses along a pitch circle is attached directly to a stepping motor, the shaft of the motor being coaxial with the pitch circle. A rotatable arm with a collimating lens is attached to the shaft for rotation along the pitch circle, with a small distance therebetween, so that the lens of the arm can be optically connected with the lenses on the faceplate when the rotatable arm is moved by means of the shaft of the stepping motor. An optical input fibre is connected to the collimating lens (hereafter called a lens-to-fibre unit) of the arm and a plurality of optical output fibres are attached to the respective collimating lenses on the faceplate for a switching operation when the rotatable arm moves from one position to another.

Configuring a plurality of 1×P rotary switches into a single stage P×P switch has the following limitations:

a) the P×P matrix is not modular and when repairs are required, they must be made to the entire switch;

b) the cost of the switch is largely dependent upon the cost of the number lens-to-fibre units required; and, c) The maximum reconfiguration time of the component 1×P rotary switch is directly dependent upon the dimension of the matrix.

It is usually preferable that optical switches be efficient, fast and compact. As telecommunication networks have evolved over the years and have become more complex, a need has arisen for a matrix switching system capable of optically coupling any one of a large number of other fibers to another. Furthermore, it is desirable for the switching system to be "non-blocking", i.e. the switching of one input fiber to an output fiber should not interfere with the light transmission of any other input fiber to any other output fiber.

It is an object of this invention, to provide a modularized non-blocking switch that can be configured from 1×n switches, or switches of other dimensions, that require fewer lens-to-fibre units than the P×P single stage switch.

It is a further object of the invention, to provide a modularized non-blocking switch that is less expensive to manufacture than the P×P single stage switch.

SUMMARY OF THE INVENTION

In accordance with the invention system of interconnected functionally identical modules for switching P optical signals to P locations in a non-blocking manner, is provided, wherein each module comprises:

M first ports, where M>1;

MR second ports where R>1, for optically coupling to second ports of other modules;

and switching means for switching between the M first ports and the MR second ports wherein at least a second port of a module is directly coupled to another second port of another module.

In accordance with the invention a system is further provided, of a number 2R of interconnected functionally identical modules for switching P optical signals to P locations in a non-blocking manner, each module comprising:

M first ports, wherein M is at least P/R;

MR second ports;

and switching means for switching between the first ports and the MR second ports, wherein the MR second ports of a module are optically coupled to second ports of other modules.

In accordance with another aspect of the invention, a method is provided of switching P optical signals to P locations in a non-blocking manner using a number 2R of interconnected functionally identical modules, comprising the steps of:

providing a first group of functionally identical modules each module including M first ports and MR second ports and switching means for switching between the first ports and the second ports;

providing a second group of functionally identical modules, each module including M first ports and MR second ports and switching means for switching between the M first ports and the MR second ports;

interconnecting the second ports of the first group of modules with the second ports of the second group of modules wherein some second ports from each module in the first group of modules are connected to some second ports of each module in the second group of modules.

In accordance with yet another aspect of the invention, a system is provided consisting of interconnected functionally identical modules for switching MR optical signals to MR locations in a non-blocking manner, each module comprising:

a plurality of M first ports;

MR second ports optically coupled to second ports of other modules;

and switching means for switching between the first ports and the second ports.

BRIEF DESCRIPTION OF THE DRAWINGS

Exemplary embodiments of the invention will now be described in conjunctions with the drawing which.

DETAILED DESCRIPTION

Figure 1:
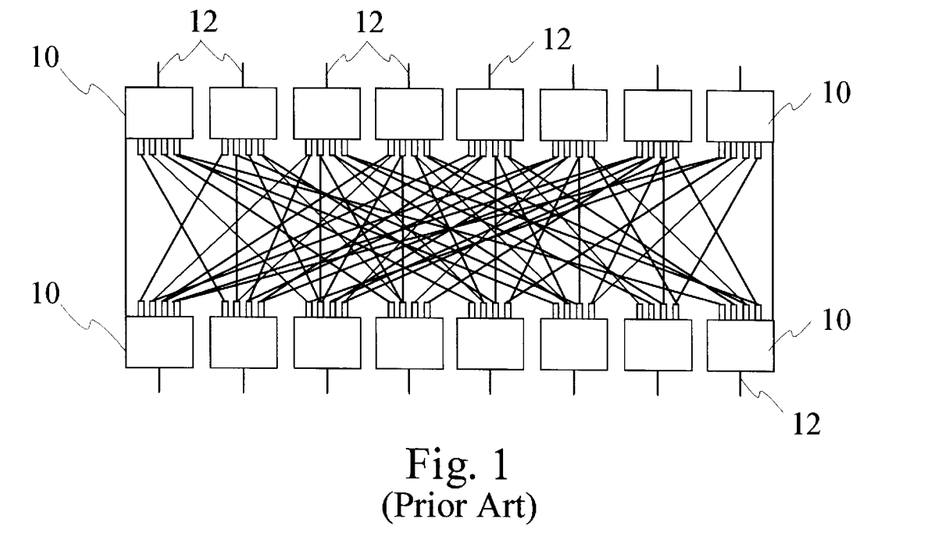
FIG. 1 is a prior art schematic diagram of a single stage 8×8 matrix switch.

Referring now to FIG. 1, a single stage switched distribution, switched recombination (SDSR) design is shown wherein each port 12 is connected to a 1×P rotary fibre switch, as is described by Duck et al. mentioned above, where P is the overall dimension of the matrix. As is illustrated, optical fibres couple each switch on one side of the matrix to each switch on the other side of the matrix. There are 2P switches including a total of 2P(P+1) lensed fibre units. Therefore the single stage 8×8 matrix shown in FIG. 1 includes a total of 16 1×8 rotary switches 10 including 144 lensed fibre units.

Figure 2:
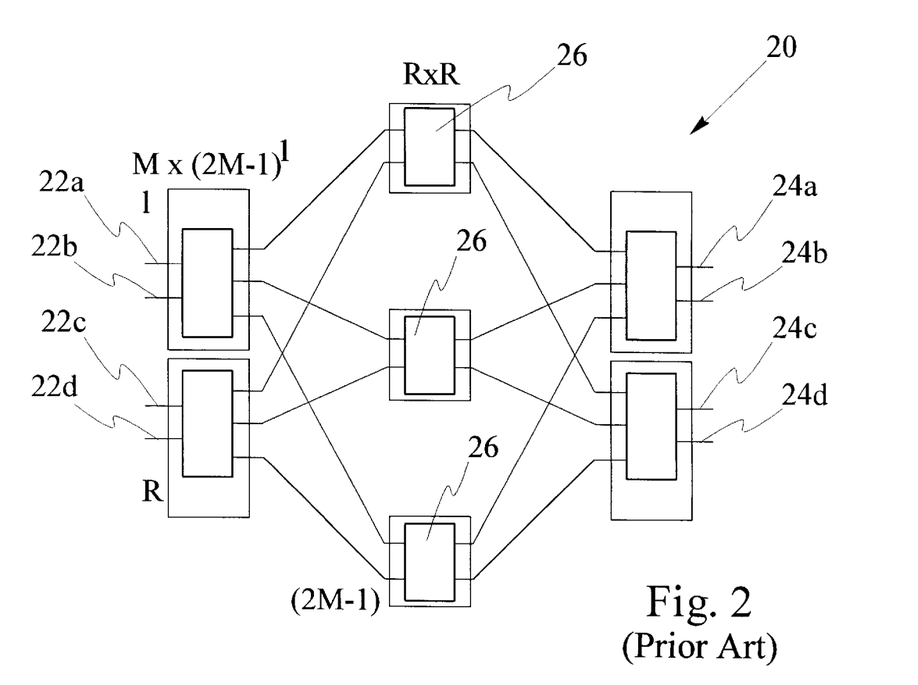
FIG. 2 is a prior art schematic diagram of a 4×4 Clos three stage matrix switch.

Turning now to FIG. 2, a non-blocking multistage matrix switch 20 is shown, hereafter called the "Clos" design. Inputs 22a . . . 22d and outputs 24a . . . 24d are grouped into R groups, of M ports (in this instance, R=2 and M=2), wherein each group forms one side of a submatrix of dimension M×(2M−1). The other side of the submatrix of dimension M×(2M−1 has one connection to each of the (2M−1)=3 central submatrices 26 of dimension R×R. The other side of the switch is symmetrical about the R×R central matrices 26.

Although the Clos design exemplified by FIG. 2 is useful in reducing the number of cross points required to achieve a non-blocking matrix switch of a particular dimension, wherein crosspoints are analogous to fibre-to-lens units, the Clos design can be improved upon. For example, the 4×4 matrix switch hereafter called the "Skol" matrix shown in FIG. 3 in accordance with this invention provides a modular multistage matrix switch that can be configured in a plurality of different ways. The central interconnection between the two sides of the switch is arranged differently from the Clos design in the present invention.

Figure 3:
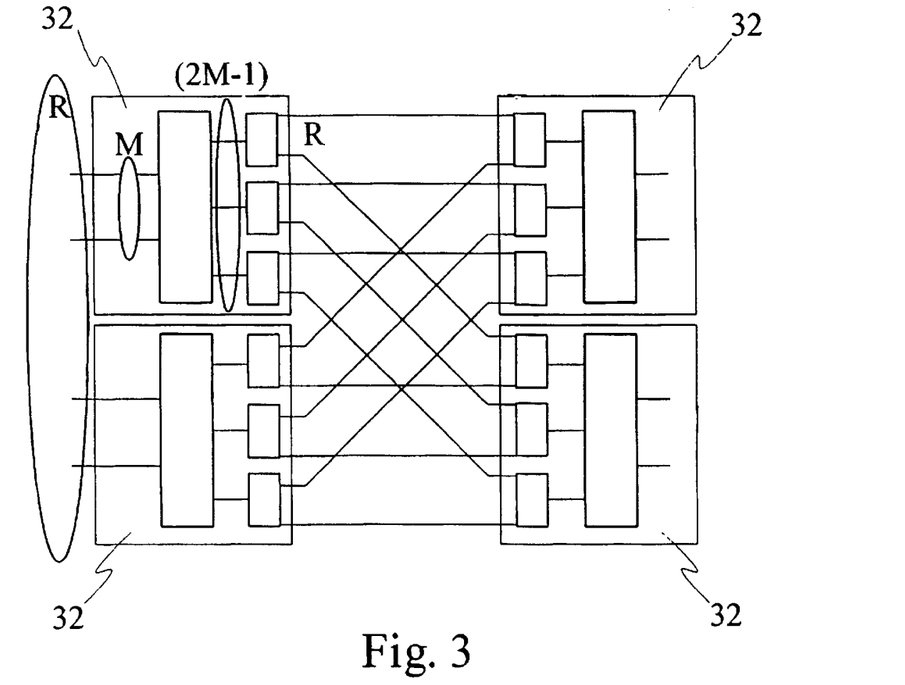
FIG. 3 is a schematic diagram of a 4×4 Skol matrix in accordance with the invention.
Figure 5A:
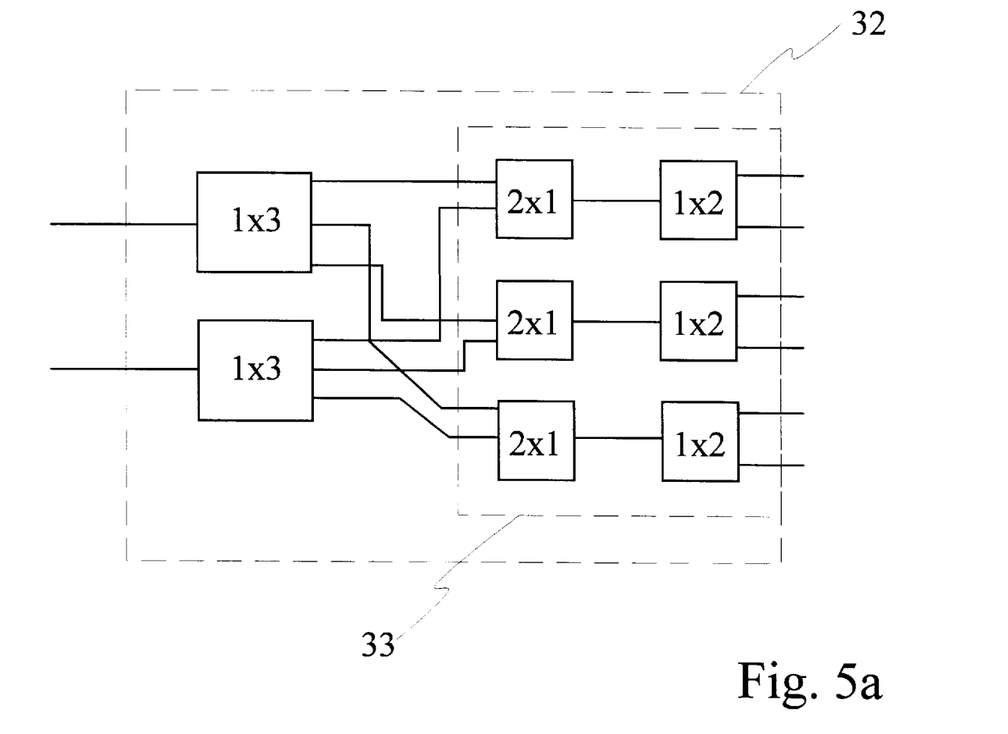
FIG. 5a is a detailed diagram of a single module of the switch shown in FIG. 3.
Figure 5B:
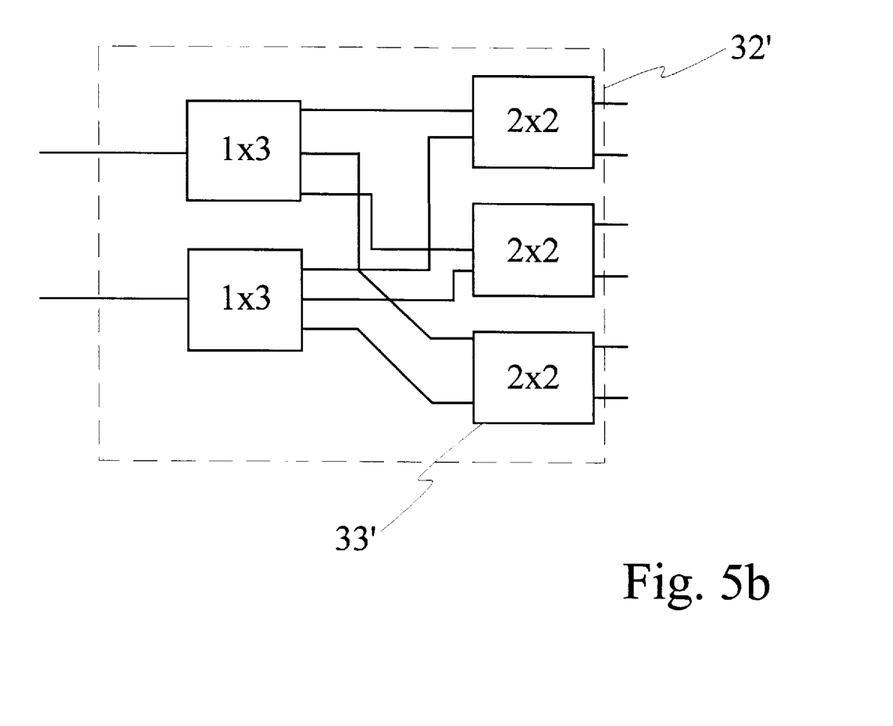
FIG. 5b is a detailed diagram of an alternative embodiment of single module of the switch shown in FIG. 3.

Advantageously, the elimination of the R×R central matrix switches 26 obviates the requirement for different switching modules required by the Clos design, and furthermore provides a more reliable architecture. Failure of one module 32 does not affect ports connected to other modules 32. Therefore, unlike the Clos design, in FIG. 3, a faulty switch can be replaced without affecting optical signals on other modules 32. Referring now to FIG. 3, and FIG. 5a each module 32 is comprised of a non-blocking 2×3 switch formed of two 1×3 switches wherein each of the three output terminals are connected to a 2×1 switch. The 2×3 non-blocking switch block within module 32 contains within it two 1×3 switches and three 2×1 switches as is shown in FIG. 5a. In an alternative embodiment shown in FIG. 5b a a non-blocking module 32' includes a blocking switch 33' which provides the required 2×2 function shown in block 33 of FIG. 5a; in this instance three 2×2 switches which themselves are allowed to block provide the functionality of the 2×1 switches coupled to the 1×2 switches.

Advantageously, by providing a single module that can be used in a variety of configurations offers economy of scale.

The interior connections are made in groups between one physical module 32 to another. Conveniently, these connections can be made with ribbon fibre, making assembly somewhat simpler and less prone to error.

In accordance with this invention, the left and right matrices of the Skol matrix shown in FIG. 3, can be reproduced a plurality of times and used as the submatrices of a one sided matrix.

Referring again to FIG. 3, in general, a P×P matrix in accordance with this invention, is designed by establishing 2R, the number of modules to be used, wherein each module is a single stage M×(2M−1) matrix, where M=ceiling[P/R], wherein the term ceiling [P/R] defines an integer greater than P/R. Each single stage matrix is optically coupled to a plurality of distribution switches each of dimension 1×R.

The number of components used in the aforementioned SDSR versus the SKOL architecture are compared in the following table. The matrix dimension is P and the number of submatrix units in the two stage switch is 2R, wherein R inputs and R outputs are provided). The SKOL and Clos designs use the same number of components and the following results apply to both.

| Component | SDSR | SKOL |
| --- | --- | --- |
| lens-fiber assemblies | 2P(P + 1) | 2R(M(1 + 2M − 1) + (2M − 1)(M + 1) + (R + 1)(2M − 1)) |
| stepping motors | 2P | 2R(M + 2M − 1 + 2M − 1) |
| splices | $P^2$ | $R\{2M^2 + (R + 2)(2M − 1)\}$ |

A principle advantage of the SKOL (multistage) design is a reduction in the number of lens-fibre units required; however, this is obtained at the expense of increasing the number of stepper motors required. At present the cost of providing additional lens-fibre units is greater than the cost of providing additional stepper motors, and this trade-off is an advantage. In the future, the 1×N switching function will likely be performed by an integrated optic device having a cost that will be small in comparison to the cost of interconnecting them, and thus the SKOL architecture is likely to be advantageous.

Figure 4A:
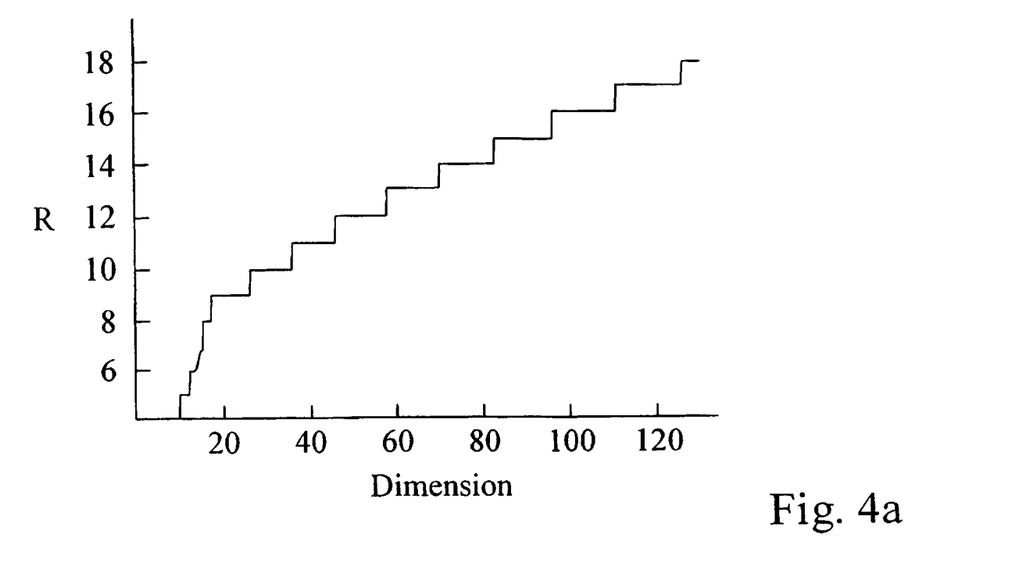
FIG. 4a is a graph of optimal values of R, versus matrix dimension.

FIG. 4a is a graph depicting optimal values of R for particular matrix dimensions that minimize the number of lens to fibres required.

Figure 4B:
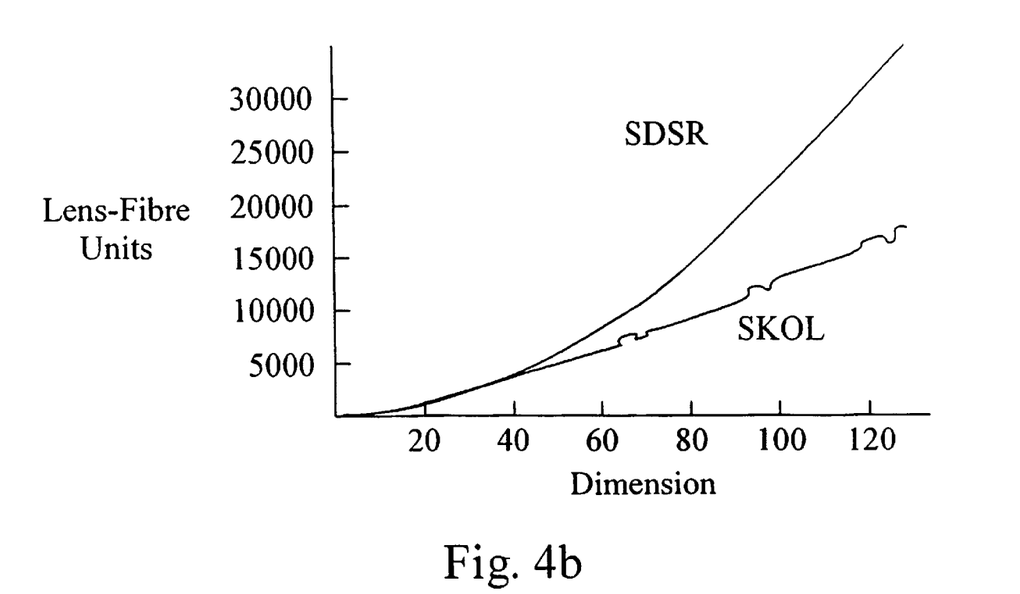
FIG. 4b is a graph depicting the number of lens fibre units required as a function of matrix dimension for a SDSR and for an SKOL matrix with optimal values of R

FIG. 4b is a graph depicting the number of lens fibre units required as a function of matrix dimension for a SDSR and for an SKOL matrix with optimal values of R. For matrices of approximately 32×32 and greater the two-stage SKOL design is advantageous over the SDSR design.

Figure 6:
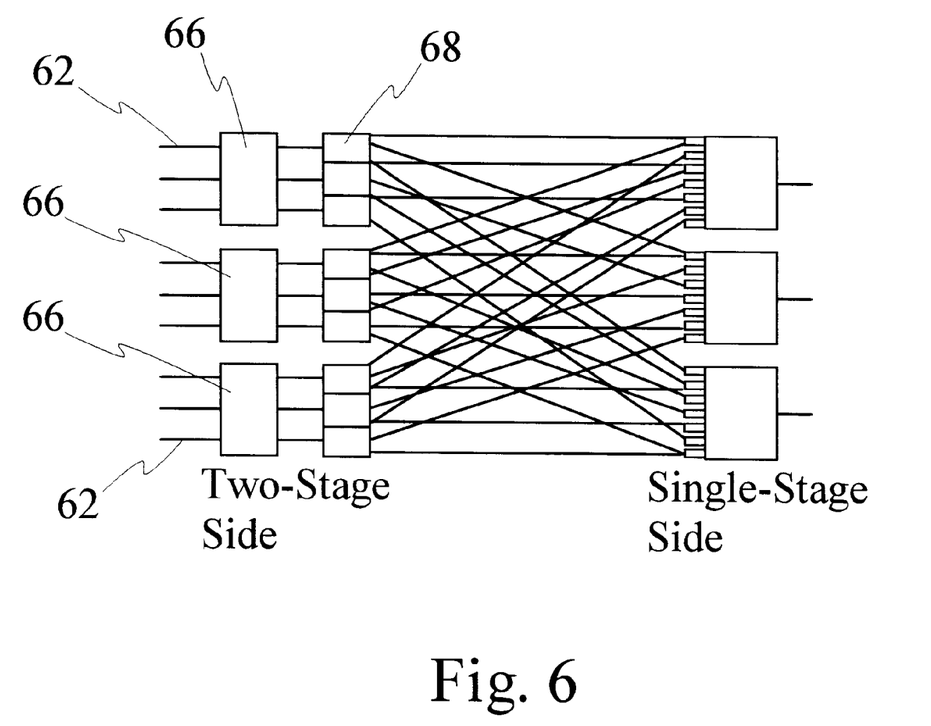
FIG. 6 is a diagram of a mixed matrix switch wherein a SKOL matrix switch is combined with a single-sided matrix switch.

One disadvantage of the SKOL architecture is that path loss is increased. Each signal must pass through three times more 1×N switches than in the SDSR matrix, wherein switches dominate path loss. Thus, a two-stage design is useful when the loss of the component switches is considerably lower than the requirement on the overall matrix. However, it is possible to provide a matrix switch wherein one side corresponds to the SDSR configuration, but the other side is a SKOL configuration, as shown in FIG. 6. This design is called a "mixed matrix". The input ports on the two-stage side 62 are grouped into R groups of M=P/R ports. These R groups are coupled to M×M switches 66. The output ports of the M×M switches are coupled to 1×R switches 68. The number of components required on the two stage side 66 is lower than it would be for a non-mixed SKOL matrix. This is due to the 1×P switches on the single stage side 64 being capable of resolving a blocking issue that two stage SKOL distribution switches cannot resolve. In this instance the optimum value of R is $(2P)^{0.5}$.

Figure 7:
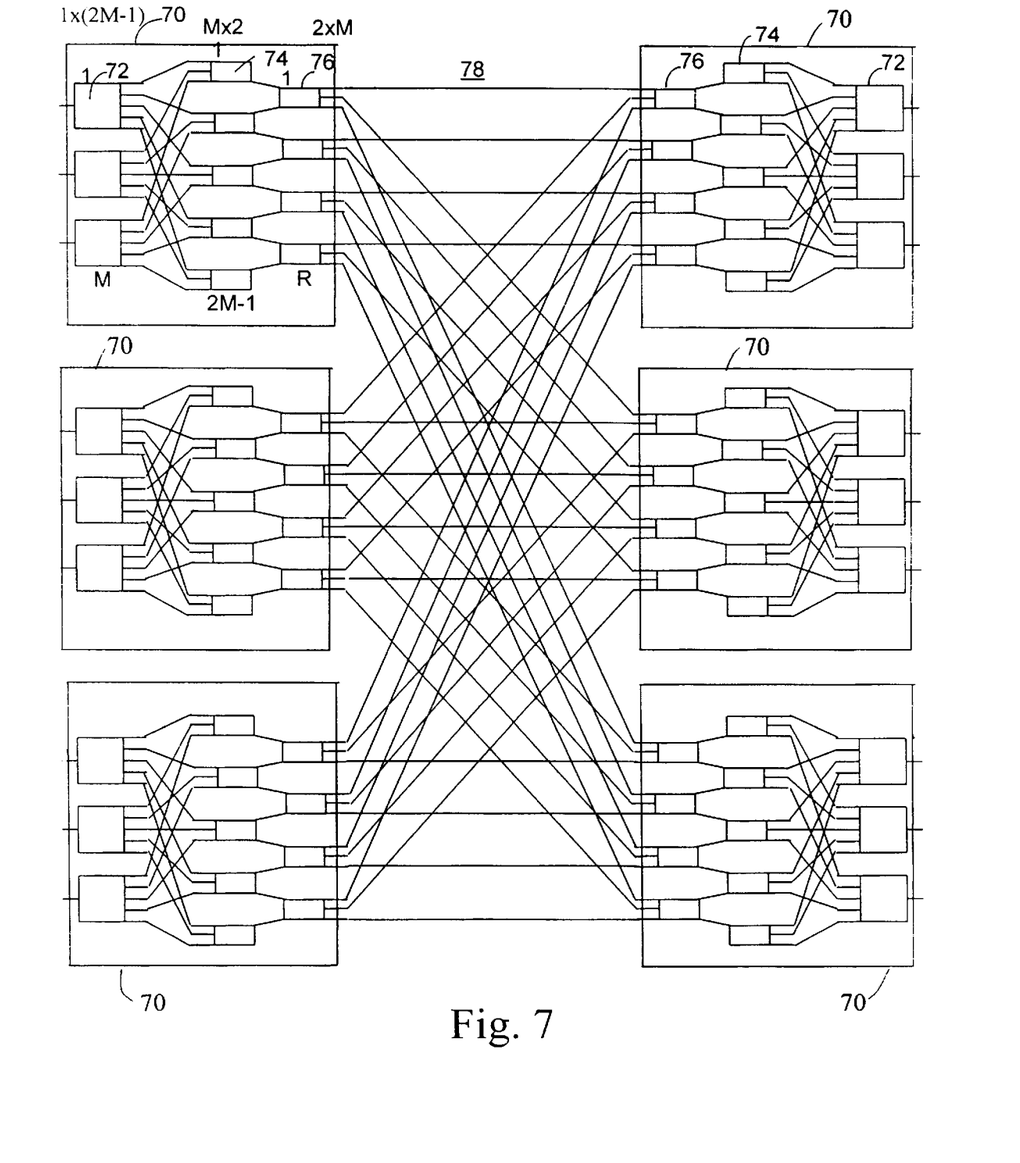
FIG. 7 is diagram of a SKOL matrix switch arrangement wherein 2R switches are combined to form a switching system; and, FIG. 8 is a diagram of a SKOL matrix wherein R M×M switches are utilized in each switching block.
Figure 8:
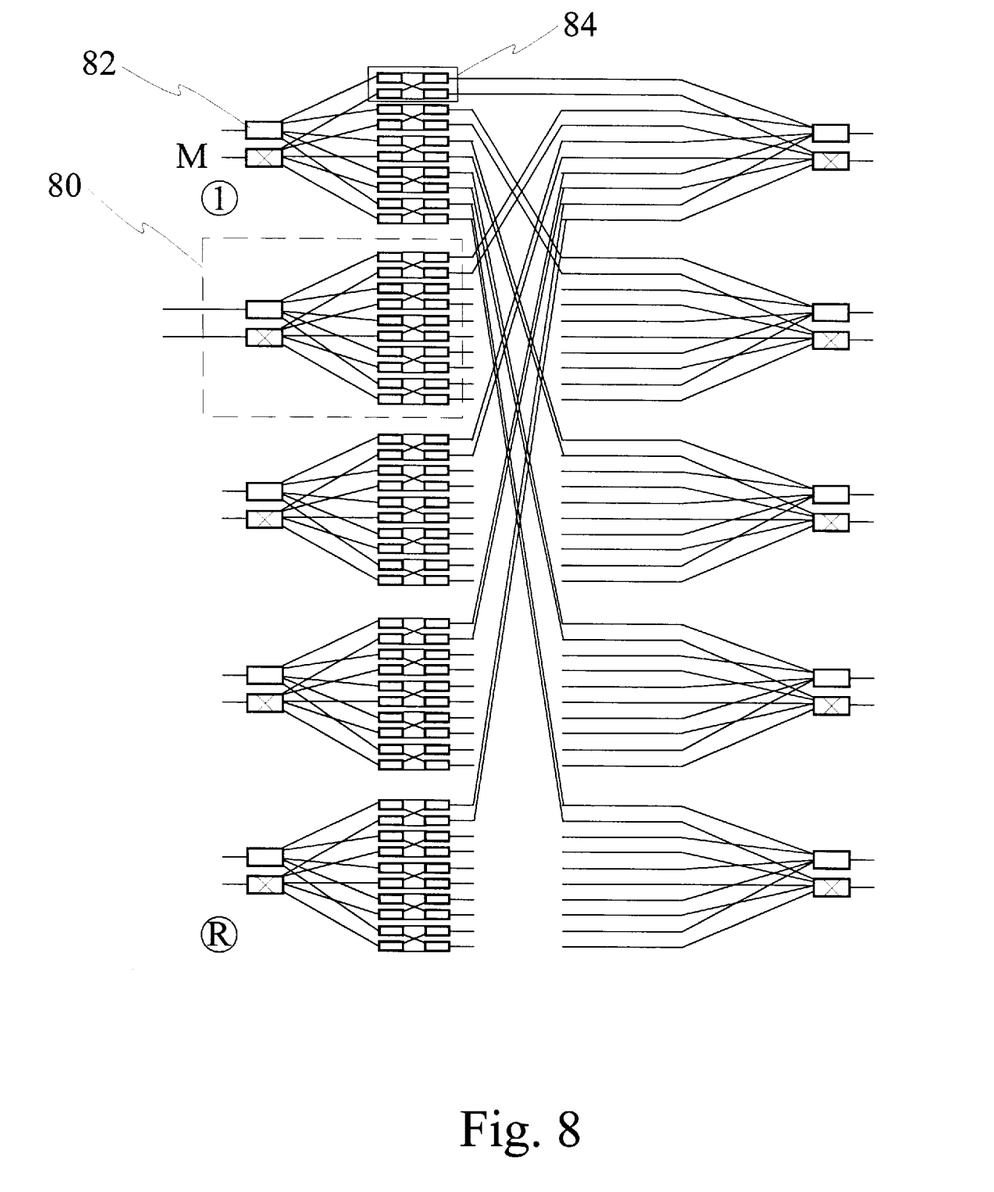

FIGS. 7 and 8 show two variants of SKOL switches wherein a greater number of sub-switches 72, 74, 76, are required to make each switching module 70, however wherein in switching module provides fewer output optical fibres, thereby forming a system wherein the backplane or interconnection region 78 has fewer optical fibres. In certain instances this is preferred.

Referring now to FIG. 7, an optical switching system is shown wherein 2R switching modules 70, where R=4 are interconnected in a non-blocking manner. As is shown in this exemplary embodiment the switching module 70 has M first ports and MR second ports. In this example each module includes M 1×(2M−1) switches 72 coupled to 2M−1 M×2 switches 74, which are coupled to R 2×M switches 76.

FIG. 8 shows an embodiment having 10 interconnected modules 80. Here, similarly to FIG. 7 M first ports are provided and MR second ports are provided. In this embodiment M 1×R switches 82 and R M×M non-blocking switches 84 are used. Conveniently, this a module 80 can be built economically using standard 2×2 switches in combination with 1×R switches.

Of course, numerous other embodiments may be envisaged, without departing from the spirit and scope of the invention.

What is claimed is:

1. A system of interconnected functionally identical modules for switching P optical signals to P locations in a non-blocking manner, each module comprising:

M first ports, where M>1;

MR second ports where R>1, for optically coupling to second ports of other modules;

and switching means for switching between the M first ports and the MR second ports wherein at least a second port of a module is directly coupled to another second port of another module.

2. A system as defined in claim 1 wherein the second ports of a module are optically coupled to second ports of other modules.

3. A module as defined in claim 2 installed within a system including of a number 2R of interconnected functionally identical modules for switching P optical signals to P locations in a non-blocking manner.

4. A module as defined in claim 3, wherein P is less than or equal to MR.

5. A system as defined in claim 1 wherein some of the MR second ports of a module are directly coupled to some of the MR second ports of another module.

6. A system of a number 2R of interconnected functionally identical modules for switching P optical signals to P locations in a non-blocking manner, each module comprising:

M first ports, wherein M is at least P/R;

MR second ports;

and switching means for switching between the first ports and the MR second ports, wherein the MR second ports of a module are optically coupled to second ports of other modules.

7. A system of a number 2R of interconnected functionally identical modules as defined in claim 6 wherein each module having M first ports and MR second ports includes R, M×M non-blocking switches.

8. A system as defined in claim 7, wherein each module comprises M, 1×R optical switches.

9. A system as defined in claim 6 wherein P is at least 30.

10. A system consisting of interconnected functionally identical modules for switching MR optical signals to MR locations in a non-blocking manner, each module comprising:

a plurality of M first ports;

MR second ports optically coupled to second ports of other modules;

and switching means for switching between the first ports and the second ports.

11. A system as defined in claim 10, wherein the functionally identical switching modules each perform a same function.

12. A method of switching P optical signals to P locations in a non-blocking manner using a number 2R of interconnected functionally identical modules, comprising the steps of:

providing a first group of functionally identical modules each module including M first ports and MR second ports and switching means for switching between the first ports and the second ports;

providing a second group of functionally identical modules, each module including M first ports and MR second ports and switching means for switching between the M first ports and the MR second ports;

interconnecting the second ports of the first group of modules with the second ports of the second group of modules wherein some second ports from each module in the first group of modules are connected to some second ports of each module in the second group of modules.

* * * * *